United States Patent [19]

Schobel et al.

[11] 4,028,777
[45] June 14, 1977

[54] CLAMPING RING AND CLOSURE MEANS

[76] Inventors: Alfred Schobel; Wilhelm Schobel, both of D-7212, Deisslingen 2-Lauffen, Germany

[22] Filed: Feb. 3, 1976

[21] Appl. No.: 654,734

[30] Foreign Application Priority Data

Feb. 8, 1975 Germany .................... 2505425

[52] U.S. Cl. .............................................. 24/16 PB
[51] Int. Cl.² ........................................ B65D 63/00
[58] Field of Search ............ 24/16 R, 16 PB, 17 R, 24/17 A, 17 AP, 19, 271, 272, 20 R, 68 R, 68 CD, 73 R, 265 R, 73 SA, 73 PB, 73 PF, 230 B, 230 F, 206 A, 208 A, 230 CF, 230 SL

[56] References Cited

UNITED STATES PATENTS

| 3,837,047 | 9/1974 | Bunnell | 24/16 PB |
| 3,860,997 | 1/1975 | Harbison et al. | 24/16 PB |
| 3,909,884 | 10/1975 | Weckesser | 24/16 PB |
| 3,922,758 | 12/1975 | Schobel et al. | 24/16 PB |

Primary Examiner—G. V. Larkin

[57] ABSTRACT

A clamping ring and closure made of plastic material comprising a closure head integrally formed at one end of a clamping ring of U-shaped section which has a passage into which can be inserted the opposite end of the clamping ring which is in the form of a tongue. Interlocking teeth are provided on the side edges of the tongue and on the side walls of the passage. The side walls of the closure head are connected together by non-overlapping spacer webs and the sawteeth on the two side walls are disposed opposite one another at the points of attachment of the spacer webs. The locking teeth are disposed on the tongue at an acute angle in relation to the longitudinal axis of the clamping ring and at their end surfaces they extend substantially perpendicularly to the longitudinal axis. Along one side edge of the tongue there is formed a reinforcing strip whose inner side is provided with sawteeth while the locking teeth formed on this side edge are widened over its outer side. The lower spacer webs lying at the exterior of the base of the clamping ring section have a portion which lies at the extremities of the limbs of the U section and offset in step form to bound a deeper portion of the passage corresponding to the reinforcing strip. A bent over portion of the spacer webs has a sawtooth facing the deeper portion of the passage.

15 Claims, 8 Drawing Figures

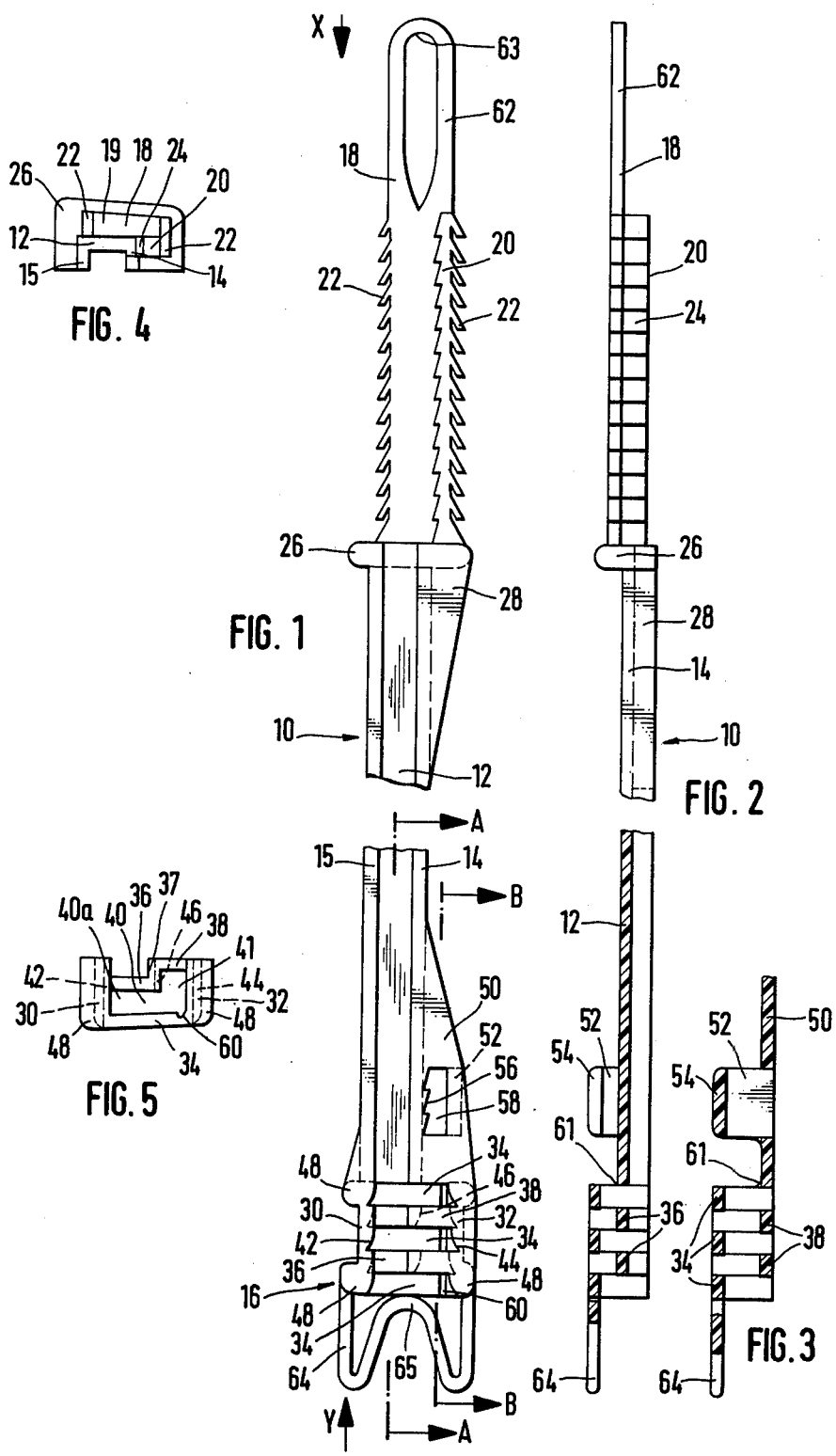

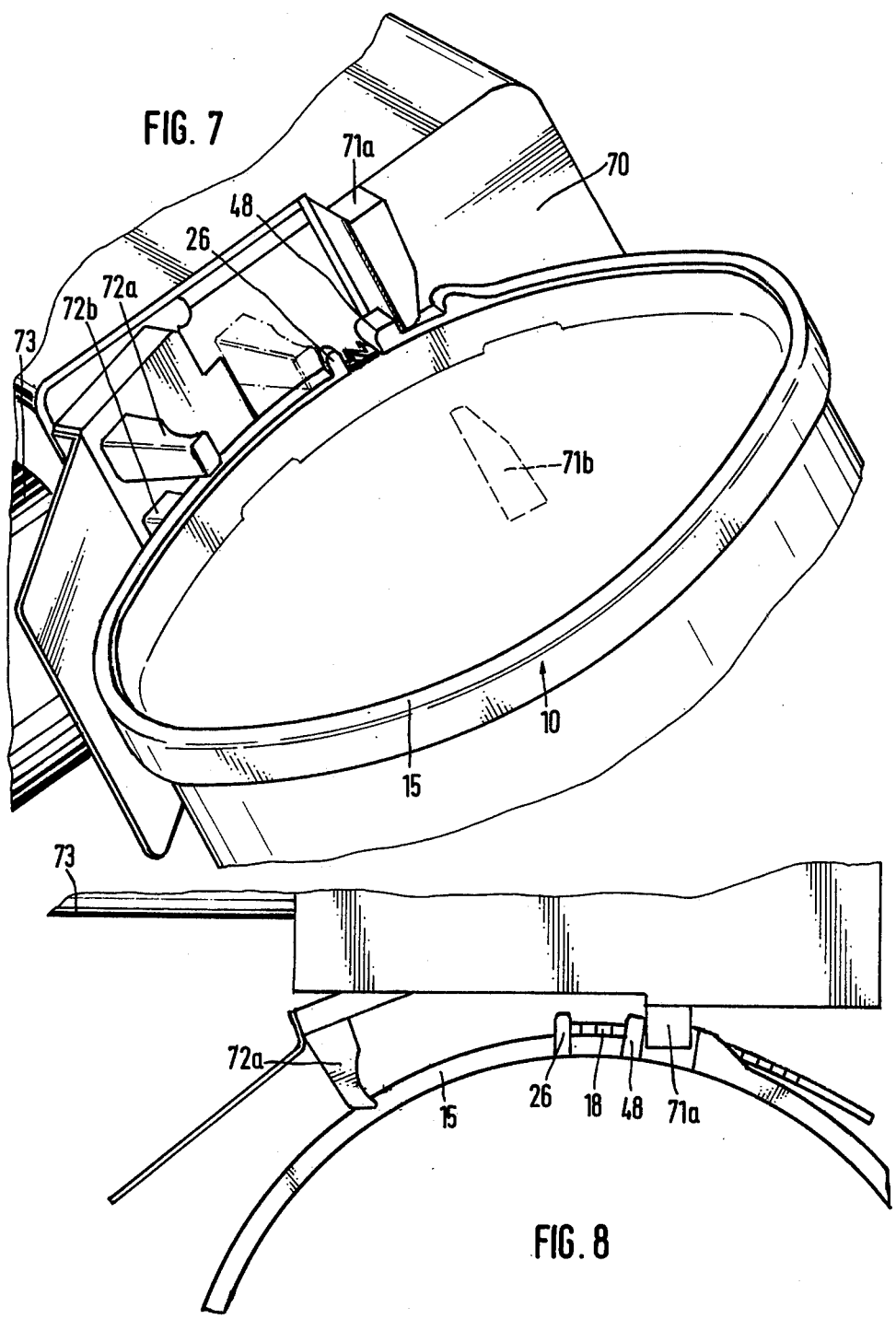

CLAMPING RING AND CLOSURE MEANS

This invention relates to a clamping ring and closure means made of plastics material, comprising a closure head integrally formed at one end of a clamping ring of U-shaped section and which has a passage into which the opposite end of the clamping ring, which opposite end is in the form of a tongue, can be inserted, and interlocking sawteeth or locking teeth provided on the side edges of the tongue and on the side walls of the passage.

Closure means of this kind serve to close containers consisting of a bucket and a lid. The U-shaped section of the clamping ring grips over the outwardly projecting edges of the bucket and lid and holds them together when the clamping ring is closed and tightened. It has been found that known clamping ring and closure means cannot withstand heavy tensile loads, since only a few locking teeth are provided in the closure head, and these are of relatively weak construction and are subject to heavy shearing forces when the closure means is subjected to tensile loads.

An improvement in respect of these disadvantages is achieved by a clamping ring and closure means of the kind first mentioned above wherein the side walls of the closure head are connected together by non-overlapping spacer webs which bound the passage on the upper side of the closure head and at the exterior of the base of the clamping ring, wherein the sawteeth on the two side walls are in each case disposed opposite one another at the points of attachment of the spacer webs, extend outwards at an acute angle in relation to the longitudinal axis of the clamping ring, and at their end surface extend approximately perpendicularly to the said longitudinal axis.

Through the formation of the locking teeth on the tongue and through the larger number of sawteeth and their arrangement opposite one another in the closure head, the effect is achieved that when the closure means is subjected to tensile loading the locking teeth are stressed practically exclusively in their longitudinal direction. This means that only pressure but no shearing forces act on the locking teeth. Even in the event of very much greater tensile loads, the locking teeth are therefore still not sheared off, so that the closure means withstands even high tensile loads.

The non-overlapping arrangement of the spacer webs permits particularly simple production of the clamping ring closure means by an injection moulding process.

Although the clamping ring closure means give very good results because of their substantially greater resistance to tensile loading, it is found, in the case of containers in which the edges projecting outwards from the pot or bucket and the appertaining lid are relatively narrow, that despite the high tensile stress that the clamping ring can withstand it is still possible to push the clamping ring away over these edges without opening it.

According to the invention this disadvantage is overcome in that along one side edge of the tongue there is formed a reinforcing strip which projects in the direction of the open section side of the clamping ring and whose inner side is provided with sawteeth, while the locking teeth formed on this side edge are widened over its outer side, wherein the lower spacer webs lying at the exterior of the base of the clamping ring have in each case a portion which lies at the extremity of the limbs of the U-section and is offset in step form and which bounds a deeper portion of the passage corresponding to the reinforcing strip, and wherein a bent-over portion of the spacer webs has a sawtooth facing the deeper portion of the passage.

On one side of the clamping ring and closure means the reinforcing strip produces a thickening of material, which brings about a further increase in tensile loadability. The widening of the locking teeth on the outer side and in addition the provision of engaging sawteeth on the inner side of the reinforcing strip also enlarges the supporting surface on engagement, so that greater tensile forces corresponding to the thickening of the material can be transmitted, thus effecting closer fitting of the clamping ring. This by itself makes it more difficult for the clamping ring to be pushed away over the edges of the container. Since the reinforcement is normally provided on the lower side of the projecting edges of the container, that is to say under the edge of the bucket, this lower side will have greater tensile loadability, so that in particular it is made difficult for the clamping ring to be pushed off over the top edge, as is necessary for the complete removal of the clamping ring.

For the purpose of locking the clamping ring use can be made of a tightening tool, for example pliers, which engages on the one hand behind reinforcing beads on the closure head and on the other hand behind a projecting collar on which the tongue is formed, for the purpose of inserting the tongue into the closure head. The pliers may be operated manually, pneumatically, or hydraulically. With the aid of pliers of this kind the clamping ring and closure means can be closed in a simple, convenient manner and, in particular, with substantially greater tensile stresses, so that the greater tensile loadability achieved through the invention for the closure means can be fully exploited.

The provision of lateral reinforcing beads on the closure head and the formation of a projecting collar on the end of the tongue of the clamping ring are independent of the special shape of the closure head and its passage and of the tongue at the other end. This arrangement can be applied to any kind of clamping ring and closure means in which a tongue-shaped end of the clamping ring is inserted into a passage in the closure head provided at the other end of the clamping ring and engages in the said passage under tensile loading with the aid of sawteeth, locking teeth, and similar engaging elements.

The clamping ring and closure means according to the invention cannot be opened once the tongue has been inserted into the closure head. This prevents both accidental and unauthorised deliberate opening of the clamping ring. The clamping ring can be opened in a simple manner by inserting a knife or a similar tool between the tongue and the top spacer webs of the closure head and cutting through these webs. The tongue can then also be lifted upwards out of the closure head.

In another embodiment of the invention it is possible to open the clamping ring without a tool. For this purpose the spacer webs are provided with a tear-open weakened portion on the upper side of the closure head, at their end adjoining one of the side walls.

The invention will now be described, by way of example, with reference to the accompanying drawings, in which:

FIG. 1 is a broken elevation of a clamping ring according to the invention,

FIG. 2 is a section on the line A—A in FIG. 1,

FIG. 3 is a section on line B—B in FIG. 1,

FIG. 4 is a view in the direction X in FIG. 1,

FIG. 5 is a view in the direction Y in FIG. 1,

FIG. 7 illustrates in perspective the closing of the clamping ring with the aid of a locking tool, and FIG. 8 is a plan view of the arrangement comprising the clamping ring and locking tool shown in FIG. 7.

Figure 6:
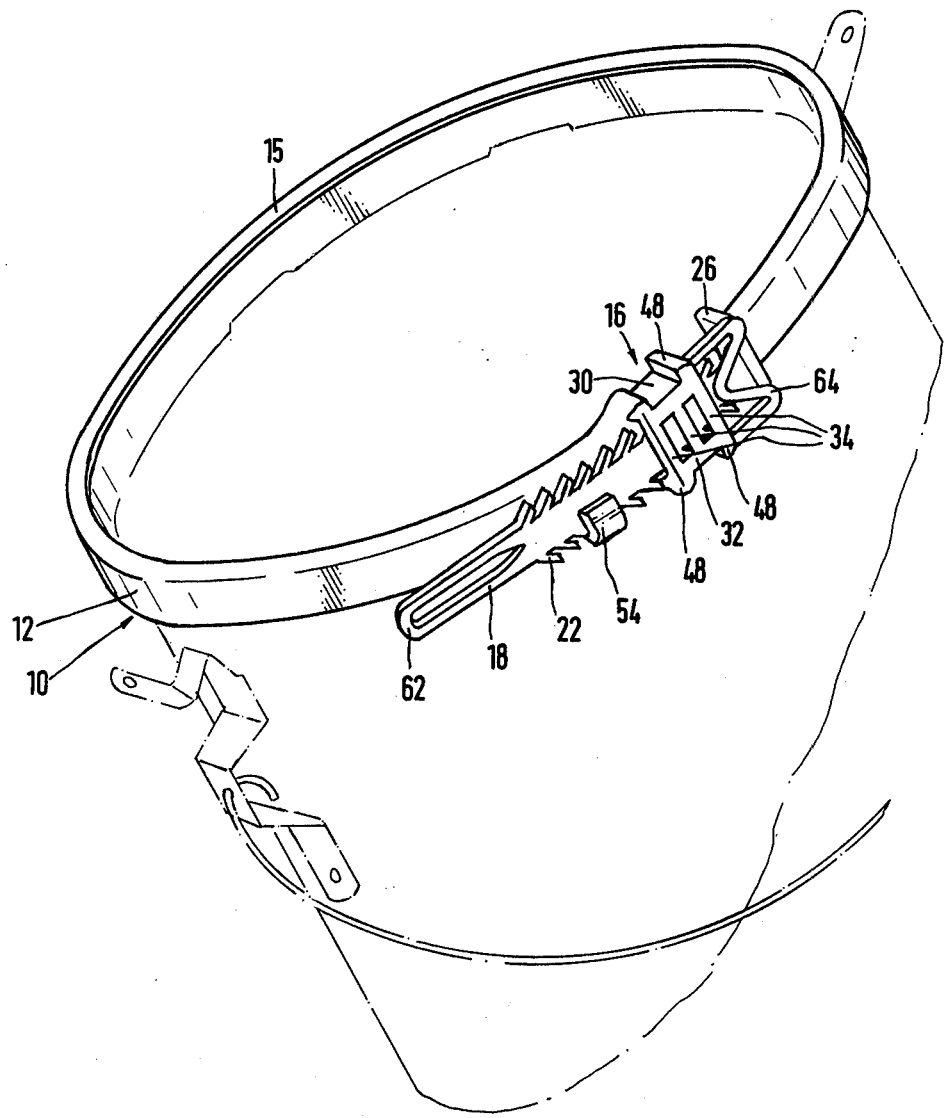
FIG. 6 is an illustration in perspective of the clamping ring applied to a container.

Referring to the drawings, the clamping ring 10 is adapted to close a container and has a U-shaped section with a base 12 and limbs 14 and 15. The clamping ring 10 is made of plastics material. One end of the ring is provided with an integral closure head 16 and the opposite end is provided with an integral tongue 18.

A reinforcing strip 20 extends along one side edge of the tongue 18. Both on the non-reinforced side edge and on the side edge of the tongue 18 which is provided with the reinforcing strip there are provided locking teeth 22. The locking teeth 22 extend on the reinforced side edge over the entire length of the reinforcing strip 20.

The locking teeth 22 extend outwards at an acute angle to the longitudinal axis of the clamping ring 10, and the end faces of the teeth 22 extend approximately perpendicularly to the longitudinal axis, as illustrated in FIG. 1. On the inner side of the reinforcing strip 20 there are formed sawteeth 24, FIG. 2, which are spaced similarly to the locking teeth 22.

As can be seen particularly in FIG. 4, in which a gripping loop 62, described below is omitted, the thickness of the tongue 18 increases from the side on which the reinforcing strip 20 is provided towards the opposite side edge 19. A thickening of material is therefore also obtained on the side edge 19 of the tongue 18, thereby increasing the tensile loadability of the side edge 19.

The tongue 18 is formed on a collar 26 which is provided at the end of the clamping ring section. The tongue 18 extends beyond the base 12 of the clamping ring 10, so that the underside of the tongue 18 is flush with the exterior of the base 12, as can be seen in FIGS. 2 and 4. The reinforcing strip 20 is laterally offset to the outside on the tongue 18, so that it extends outside the extension of the limb 14. On the outer side of the limb 14 there is provided a reinforcing flange 28 which widens from the outer side of the limb 14 in the direction of the collar 26.

The closure head 16 consists of two side walls 30 and 32, of which the side wall 30 lies in line with a prolongation of the limb 15. The other side wall 32 is offset laterally outwards in relation to the limb 14, similarly to the reinforcing strip 20. The side walls 30 and 32 are joined together by spacer webs 34 and 36. The spacer webs 34, 36 are situated alternately on the upper side of the closure head (spacer webs 34) and at the height of the base 12 of the clamping ring (spacer webs 36). The spacer webs 34 and 36 are offset in relation to one another in such a manner, as can be seen in FIGS. 1 to 3, that they form no undercuts. The spacer webs 34 and 36 bound a passage 40 into which the tongue 18 can be inserted. The distance between the spacer webs 34 and 36 therefore corresponds to the thickness of the tongue 18.

The upper spacer webs 34 are also provided at their end adjoining the side wall 32 with a weakened portion 60 which permits easy tearing-open of the spacer webs.

As can be seen most clearly from FIG. 5, in which a gripping loop 64 described below is omitted, the lower spacer webs 36 are bent over to form a portion 38 which lies at the extremities of the limbs 14 and 15. The bent-over portion 37 lies in line with the limb 14, so that the lower spacer webs 36 — apart from the portion 38 represent in cross-section an extension of the section of the clamping ring 10. The side wall 32, the bent-over portion 37, and the portion 38 of the lower spacer webs form a deeper passage portion 41, which serves to receive the reinforcing strip 20.

As can be seen most clearly from FIG. 5, the depth of the passage 40 increases from the side of the deeper portion 41 of the passage in the direction of the side wall 30. The increase in depth of the passage 40 on the side 40a corresponds to the thickening of the side edge 19 of the tongue 18.

Inside the passage 40 there are formed on the side wall 30 sawteeth 42, which are in each case disposed at the points of attachment of the spacer webs 34 and 36 and whose length in the direction of the axis of th clamping ring corresponds to the width of the spacer webs in that direction, as can be seen in FIG. 1. On the side wall 32 sawteeth 44 are likewise formed in the same manner. Finally, the bent-over portions 37 of the lower spacer webs 36 are bevelled on their side facing the deeper portion 41 of the passage so that they likewise form sawteeth 46.

On the outer side of the side walls 30 and 32 are formed reinforcing beads 48, which extend at right angles to the longitudinal axis of the clamping ring 10.

On the limb 14 of the clamping ring 10 there is formed, at its end, a reinforcing flange 50 which widens in the direction of the side wall 32. From the reinforcing flange 50 a bow 52, having a bent-over end 54, projects vertically upwards. The flange 50, the bow 52, the bent-over end 54 of the latter, and the outer side of the limb 14 bound a cross-section corresponding to the deeper portion 41 of the passage. On the outer side of limb 14 there are formed, opposite the bow 52, three sawteeth 56 which have the same spacing as the sawteeth 42, 44, and 46 and the locking teeth 22.

In the reinforcing flange 50 there is provided, opposite the bent-over end 54 of the bow, an aperture 58 whose cross-section corresponds to the size of the bent-over end 54. The aperture 58 ensures that the bow 52 together with its bent-over end 54 can be produced by an injection moulding method without any undercuts.

As can be seen particularly from FIGS. 1 to 3, a gripping loop 62 is integrally formed at the front end of the tongue 18. The width of the gripping loop 62 corresponds to the width of the tongue 18, so that the gripping loop 62 does not hinder the introduction of the tongue 18 into the passage provided in the closure head. The gripping loop 62 has an aperture which is sufficiently large to enable a finger to be conveniently engaged in the gripping loop. In order to prevent the gripping loop 62 from cutting into the finger, the front edge 63 of the gripping loop is suitably rounded.

At the other end of the clamping ring a gripping loop 64 is integrally formed on the closure head. As can be seen in FIG. 1, the gripping loop 64 has an M-shape.

The side arms of the gripping loop 64 sit on the reinforcing beads 48 of the side walls 30 and 32 respectively of the closure head, at the height of the upper spacer webs 34. In this way the middle portion 65 of the gripping loop 64 is situated in the plane of the upper spacer webs 34, and the tongue 18 can be introduced unhindered under the gripping loop 64 and into the passage 40 in the closure head.

For the purpose of closing the clamping ring 10, the tongue 18 is inserted into the closure head 16. The tongue 18 is for this purpose pushed into the passage 40, the reinforcing strip 20 being received by the deeper portion 41 of the passage. The tongue 18 lies on the upper side of the base 12 or of the lower spacer webs 36, while the reinforcing strip 20 lies against the outer side of the bent-over portions 37 of the spacer webs or against the outer side of the limb 14. The tongue 18 together with the reinforcing strip 20 therefore does not project at any point into the interior of the U-section of the clamping ring or into the extension of the section which is formed by the lower spacer webs 36.

Consequently, both the clamping ring and the closure means lie close against the edges of the container. The reinforcing flanges 28 and 50 and also the portions 38 of the lower spacer webs lie against the wall of the container bucket when the closure means is closed. The closure means is therefore supported on this wide support surface, so that it is no longer possible for it to be pushed off in the downward direction. The locking teeth 22 of the tongue 18 come into engagement with the sawteeth 42 and 44 respectively, while the sawteeth 24 of the reinforcing strip 20 come into engagement with the sawteeth 46.

The bent-over end 54 of the bow 52 engages around the edge of the tongue 18 which is provided with the reinforcing strip 20 and holds it in contact with the upper side of the base 12 of the clamping ring, as can be seen in FIG. 6. At the same time the sawteeth 24 on the inner side of the reinforcing strip 20 come into engagement with the sawteeth 26 on the outside of the limb 14, whereby the point of attachment of the closure head to the clamping ring (designated 61 in FIGS. 2 and 3) is additionally relieved of tensile load. The reinforcing strip 20 and the deeper portion 41 of the passage can take the greater tensile stress, due to the greater thickness of material and to the additional toothing provided on the inner side of the reinforcing strip. Through the reinforcing flanges 28 and 50 the tensile stress is transmitted to the limb 14 of the clamping ring 10.

For the purpose of opening the closure means, the tongue 18 is gripped by the gripping loop 62 and pulled out under the bent-over end 54 of the bow 52. If the tongue 18 is then pulled up vigorously, the upper spacer webs 34 can be torn open along their weakened portions 60, so that the tongue 18 can be pulled out of the closure head. The end of the clamping ring provided with the tongue 18 is at the same time held fast by the gripping loop 64 provided on the closure head. The clamping ring is thus detached from the container but is not opened completely. Through the powerful pull applied to the end provided with the tongue 18, the middle portion 65 of the N-shaped gripping loop is bent up, so that it projects upwards from the plane of the upper spacer webs 34.

For the purpose of re-closing the clamping ring opened in this manner, the tongue 18 can be re-inserted into the passage 40 in the manner described above, the upper spacer webs 34, which are now fastened only on one side, and the bent-over end 54 of the bow 52 preventing the tongue 18 from spontaneously lifting out of the passage 40 in the upward direction. After the insertion of the tongue 18, the latter can be gripped by its gripping loop 62 and the closure head can be gripped by its gripping loop 64, the gripping being in particular facilitated by the fact that the middle portion 65 of the gripping loop 64 has now been bent upwards, whereupon a powerful pull applied to the gripping loops 62 and 64 enables the clamping ring closure means to be firmly closed again.

The reinforcing beads 48 on the side walls 30 and 32 give the side walls adequate stability, so that even when the upper spacer webs 34 have been separated on one side the locking teeth 22 reliably come into engagement with the sawteeth 42 and 44.

In a particularly advantageous manner the clamping ring can be closed with the aid of a closing tool 70, as can be seen in FIGS. 7 and 8. The closing tool 70 has two pairs of closing jaws 71a, 71b and 72a, 72b. The pair of closing jaws 72a, 72b is slidable in relation to the pair of closing jaws 71a, 71b, in such a manner that the path of movement substantially follows the peripheral line of the container that is to be closed.

The pair of closing jaws 72a, 72b can be displaced for example with the aid of a push-rod 73, which is operated mechanically, hydraulically, pneumatically, or in a similar manner. For the purpose of closing the clamping ring, the closing jaws 71a and 71b dispose in a fixed position on the closing tool 70 are inserted between the reinforcing beads 48 on the closure head, so that they act from the rear on the front reinforcing beads. The slidable closing jaws 72a and 72b act from above and below respectively on that end of the clamping ring which is provided with the tongue 18. When the pair of closing jaws 72a, 72b is pushed towards the pair of fixed closing jaws 71a, 71b, the closing jaws 72a, 72b bear from the rear side against the projecting collar 26, on which the tongue 18 is formed, as indicated in dash-and-dot lines in FIG. 7. When the pair of closing jaws 72a, 72b is then further pushed towards the pair of closing jaws 71a, 71b, the tongue 18 is inserted under the pressure applied by the pushrod 73 into the passage 40 in the closure head 16. The tensile stress applied to the entire clamping ring or clamping ring closure means thus corresponds to the pressure by which the pairs of closing jaws of the closing tool 70 are pushed towards one another.

What we claim is:

1. A clamping ring and closure means made of plastics material comprising a closure head integrally formed at one end of a clamping ring of U-shaped section and which has a passage into which the opposite end of the clamping ring, which opposite end has the form of a tongue, can be inserted, and interlocking sawteeth or locking teeth provided on the side edges of the tongue and on the side walls of the passage, said closure head having side walls connected together by non-overlapping spacer webs which bound the passage on the upper side of the closure head and at the exterior of the base of the clamping ring, the sawteeth on the two side walls being in each case disposed opposite one another at the points of attachment of the spacer webs, the locking teeth disposed on the tongue, extending outwards at an acute angle in relation to the longitudinal axis of the clamping ring, and at their end surfaces extending approximately perpendicularly to said longitudinal axis, along one side edge of the tongue there being formed a reinforcing strip which projects in the direction of the open section side of the clamping ring and whose inner side is provided with sawteeth, while the locking teeth formed on this side edge are widened over its outer side, the lower spacer webs lying at the exterior of the base of the clamping ring section having in each case a portion which lies at the extremities of the limbs of the U-section and being offset in step form and which bounds a deeper portion of the passage corresponding to the reinforcing strip, and a bent-over portion of the spacer webs having a sawtooth facing the deeper portion of the passage.

2. A clamping ring and closure means according to claim 1, wherein the tongue and the closure head are widened on one side in relation to the clamping ring section, said reinforcing strip extending outside the extension line of the limb of this side on the widened portion of the tongue, and the bent-over portions of the lower spacer webs lying in the extension line of this limb.

3. A clamping ring and closure means according to claim 2, wherein at each end of the clamping ring there is formed a reinforcing flange which widens from the outer side of the limb towards the widened portion of the tongue and towards the closure head respectively.

4. A clamping ring and closure means according to claim 1, wherein the tongue increases in thickness from the edge provided with the reinforcing strip in the direction of the opposite side edge, the passage in the closure head increasing correspondingly in thickness on the side facing away from the deeper portion.

5. A clamping ring and closure means according to claim 3, wherein a bow, which is bent over at its end and which embraces that edge of the tongue which is pushed through the closure head and is provided with the reinforcing strip, projects perpendicularly from a reinforcing flange of the closure head end.

6. A clamping ring and closure means according to claim 5, wherein on the outer side of the limb of the clamping ring, opposite the bow, there is formed at least one sawtooth which engages in the sawteeth on the inner side of the reinforcing strip.

7. A clamping ring and closure means according to claim 6, wherein opposite the bent-over end of the bow an aperture of the same size as this end is provided in the flange.

8. A clamping ring and closure means according to claim 1, wherein on the outer side of the side walls of the closure head there are formed reinforcing beads which extend perpendicularly to the axis of the clamping ring.

9. A clamping ring and closure means according to claim 1, wherein the tongue is formed on a collar projecting beyond the cross-section of the clamping ring.

10. A clamping ring and closure means according to claim 9, wherein the widening reinforcing flange is attached to the collar.

11. A clamping ring and closure means according to claim 1, wherein the spacer webs on the upper side of the closure head are provided at their end adjoining one of the side walls with a weakened portion adapted to be torn open.

12. A clamping ring and closure means according to claim 1, wherein a gripping loop is formed on the tongue and also on the closure head.

13. A clamping ring and closure means according to claim 12, wherein the width of the gripping loop formed on the tongue is equal to the width of the tongue or of the passage in the closure head.

14. A clamping ring and closure means according to claim 12, wherein the gripping loop formed on the closure head is M-shaped and is formed at the height of the upper spacer webs.

15. A clamping ring and closure means made of plastics material comprising a closure head which is formed at one end of the clamping ring and which has a passage into which the other end of the clamp ring, which is in the form of a tongue, can be inserted, while interlocking sawteeth, locking teeth, or similar engaging elements are provided on the tongue and in the passage, according to claim 1, wherein the tongue is formed on a collar which projects beyond the cross-section of the clamping ring, and wherein on the outer side of the side walls of the closure head there are formed beads extending perpendicularly to the axis of the clamp ring.

* * * * *